Jan. 1, 1935.  F. BLEY  1,985,972
ABRASIVE SAW TOOTH
Filed March 5, 1934
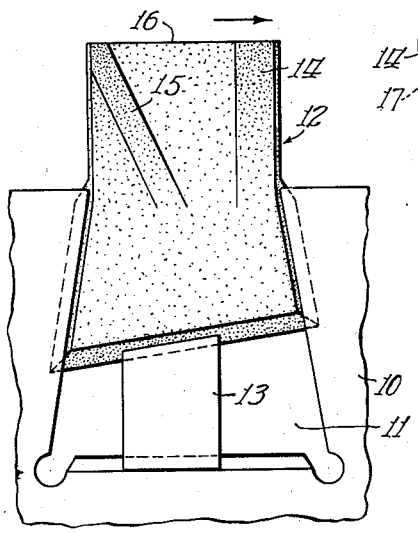
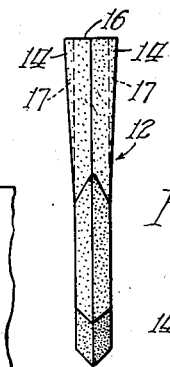
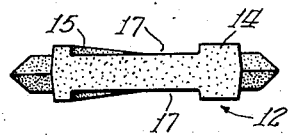
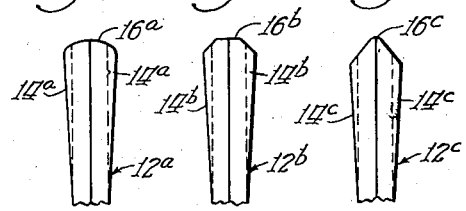
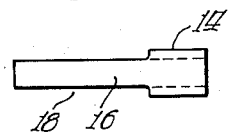
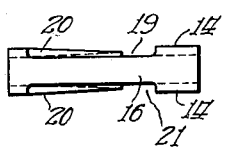
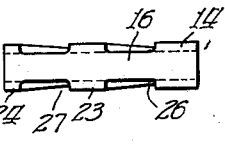
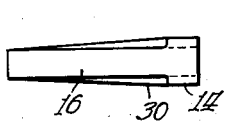
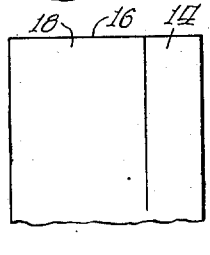
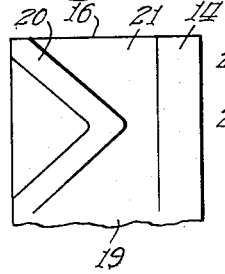
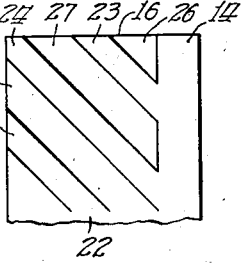
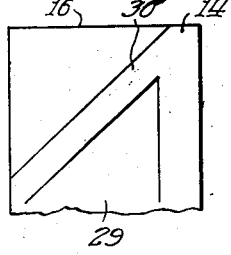
Witness:
V. Silfander
Inventor
Fred Bley
By: Hill & Hill
Attys.

Patented Jan. 1, 1935

1,985,972

UNITED STATES PATENT OFFICE 1,985,972

ABRASIVE SAW TOOTH

Fred Bley, Chicago, Ill., assignor of one-half to Martin Hoerer, Chicago, Ill.

Application March 5, 1934, Serial No. 714,041

9 Claims. (Cl. 125—22)

My invention relates to stone saws and more particularly it relates to unitary saw teeth constructed of abrasive material and adapted to be detachably mounted on a saw body and removed from time to time as the teeth are worn down or otherwise become unsuitable for use.

The invention has as an object the provision of saw teeth of the kind described providing improved details of construction resulting in diminished frictional resistance and correspondingly increased efficiency of operation of a saw equipped therewith.

Contact of the side faces of the teeth with the bounding walls of the groove formed in the stone during the cutting operation provides a frictional resistance proportional to the contacting areas tending to lower the efficiency of operation by slowing up the speed for a given amount of power or by requiring more power for operation at a given rate, and another object of the invention is the provision of an improved abrasive saw tooth so constructed that only a relatively small portion of its side faces frictionally contact with the side walls of the groove formed in the stone by the operation of the saw in which the teeth are mounted, each tooth providing channels through which the sludge may flow freely without adding to the frictional resistance.

Still another object of the invention is the provision of saw teeth of the kind described providing improvements which increases the efficiency of the saw in which they are mounted by reducing the amount of power required for the accomplishment of a given amount of work.

The teeth are formed by molding from any suitable abrasive material, such for example, as silicate carbide, the material used being characterized by its becoming rigid and hard after setting.

The teeth are provided with spaced apart integral laterally projecting sections, each having its maximum thickness adjacent the grinding surface and gradually converging towards the base portion of the tooth. This construction permits only the outer end of the sections to contact with the side walls of the grooves formed in the work and the resulting frictional resistance is correspondingly slight. The spaces between the thin portions of the teeth and the work, permit the free discharge of sludge which would otherwise also offer resistance to the movement of the saw through the work and another object of the invention is the provision of an improved saw tooth molded of abrasive material in a manner such that the main body of the tooth does not contact with the work.

A further object of the invention is the provision of an abrasive saw tooth of the kind described which is adapted to be manufactured at low cost and is satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing wherein like reference characters indicate like or corresponding parts:

Fig. 1 is a view of a fragmentary portion of a saw body and of a tooth embodying the principles of the invention;

Fig. 2 is a front end elevational view of the tooth shown in Fig. 1;

Fig. 3 is a top plan view of the tooth shown in Figs. 1 and 2;

Figs. 4, 5, and 6 are, respectively, front end views of a fragmentary portion of saw teeth each similar to that shown in Figs. 1, 2, and 3, with slightly modified details of construction;

Figs. 7 and 8 are, respectively, top plan and fragmentary side elevation views of another saw tooth embodying the principles of invention;

Figs. 9 and 10 are, respectively, top plan and fragmentary side elevational views of another saw tooth embodying the principles of the invention;

Figs. 11 and 12 are, respectively, top plan and fragmentary side elevational views of another modified form of tooth embodying the principles of the invention; and Figs. 13 and 14 are, respectively, top plan and fragmentary side elevational views of still another modified form of tooth embodying the principles of the invention.

Referring now more particularly to the drawing, the numeral 10 generally designates a fragmentary portion of a cylindrical metallic saw body. The saw body 10 is provided with a plurality of recesses 11 arranged in spaced apart relation in its outer periphery, only one of the recesses being shown, and each adapted to receive teeth embodying the principles of the invention. The teeth 12 are detachably mounted on the saw body 10 by having their base portions inserted in the recesses 11 and held in fixed position by wedge blocks 13. The fastening means is a well known construction and further description is omitted as it forms no part of the invention.

The teeth 12 are each formed by molding abrasive material while plastic to form a flat relatively long body as shown. Both the base portion and the projecting portion of the teeth are of a thickness slightly greater than that of the saw body 10, the thickness of the projecting portion of the teeth being uniform except for sections 14 and 15.

The section 14 extends along the front edge of the tooth 12 with its maximum thickness at its juncture with the outer end of the tooth which provides a grinding surface 16. The section 14 projects equally from opposite sides of the tooth and its thickness gradually diminishes towards the saw body in a manner that it is symmetrical relative to the main body of the tooth. The section 15 extends diagonally from the rear of the tooth as shown and has its maximum thickness at its juncture with the grinding surface 16. The section 15 also projects equally from opposite sides of the tooth and diminishes uniformly toward the saw body 10. The section 14 initially contacts with the stone and its width determines the width of the groove formed in the work. The width of the groove made by the tooth is less as the tooth is ground away, and the only portions of the side faces of the section 14 which contact with the side walls of the grooves are those immediately adjacent juncture of the section with the grinding surface 16.

The section 15 is provided to contact with the wide walls of the work to prevent or minimize vibration of the tooth and saw body and for this purpose the sections 14 and 15 are so constructed that their thicknesses are equal at equal distances from the axis of rotation of the saw body 10. As the tooth is worn away and the grinding surface 16 gradually recedes, the maximum thicknesses of the remaining portion of the sections 14 and 15 remain equal and by reason of the described taper are always of equal thickness at their juncture points with the receding grinding surface. The spaces 17 between the sections 14 and 15 permit free flow of sludge from the work, and the wedge shaped spaces between the sections and the side walls of the groove formed in the work permit free flow of water and sludge therethrough.

Figs. 4, 5, and 6, illustrate teeth, 12a, 12b, and 12c similar in construction to the tooth 12. The grinding surface 16a differs from the surface 16 in that it is curved instead of flat. The grinding surface 16b has its middle portion bounded by a plane of substantial width and terminating in inclined plane surfaces. The grinding surface 16c comprises two sharply inclined planes connected by a narrow transverse plane. Since only the middle portion of the grinding surfaces 16a, 16b and 16c initially contact with the work there is little or no liability of their edges chipping off by the shock of initial engagement.

The tooth 18, shown in Figs. 7 and 8, is similar to the tooth 12 in that its main body portion is of uniform thickness and has a thick front section 14, but it differs from the tooth in that it has no rear section corresponding to the section 15.

The tooth 19 is also similar to the tooth 12, differing therefrom in that it is provided with a rear section 20, the outer portion of which extends diagonally from the rear end of the grinding surface 16 inwardly towards the section 14, and its inner end extends inwardly and away from the section 14. The section 20 is symmetrical to the main body of the tooth and the thickness of the sections 14 and 20 are equal at equal distances from the saw body in which the tooth is mounted.

A tooth 22 having a main body of uniform thickness is illustrated in Figs. 11 and 12. The tooth 22 is provided with a front section 14 tapering, as described, away from the grinding surface 16. A plurality of diagonally extending sections, respectively numbered 23, 24 and 25, each project symmetrically from opposite sides of the tooth and converging uniformly towards the base portion. Spaces 26 between sections 14 and 23, spaces 27 between sections 23 and 24, and spaces 28 between sections 24 and 25 permit free flow of sludge out of the work as the tooth is moved therethrough.

The tooth 29, shown in Figs. 13 and 14, has its main body of uniform thickness and a section 14 on its front edge similar to the sections 14 on the tooth hereinbefore described. A section 30 extends diagonally away from the juncture of the grinding surface 16 with the section 14, the section being also symmetrical to the main body of the tooth and gradually diminishing in thickness towards the base portion. The thickness of the section 30 is equal to the thickness of the section 14 at equal distances from the axis of rotation from the saw body when the tooth is in operative position.

Each of the diagonally extending sections provided on the various teeth shown in the drawing, and hereinbefore described has its side surfaces uniformly inclined in such a manner that their lines of juncture with the grinding surface are always straight.

Each of the front sections in the various teeth hereinbefore described has its lateral edges bounded by plane surfaces equally and uniformly converging towards the base portion of the tooth. The front and diagonally extending sections of each tooth are so formed that a plane perpendicular to the radial axis of the tooth and cutting through the sections will always pass through areas of equal width in the two sections, such areas being bounded laterally by parallel straight lines.

Thus, it will be seen that I have provided improved saw teeth of the kind described, providing novel details of construction adapted to increase the efficiency of a saw on which they are mounted by minimizing the possible frictional resistance of such teeth by reason of the limited areas of the side portions adapted to contact with the walls of the groove formed in cutting the stone.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent, is:

1. An abrasive saw tooth comprising a flat relatively long body having one end providing a base portion adapted for mounting on a rotatable support with its other end projecting from the support and its outer extremity providing a grinding surface, all of said projecting portion except a narrow front edge section being of uniform thickness and bounded on opposite sides by parallel plane surfaces, said narrow front section being thicker than the main body thereof.

2. An abrasive saw tooth comprising a flat relatively long body having one end providing a base portion adapted for mounting on a rotatable support with its other end projecting from the support and its outer extremity providing a grinding surface, all of said projecting portion, except a narrow front edge section, being of uniform thickness and bounded on opposite sides by parallel plane surfaces, said narrow front section being thicker than the main body thereof, both lateral faces of said section lying outside of the adjacent parallel plane surfaces.

3. An abrasive saw tooth comprising a flat relatively long body having one end providing a base portion adapted for mounting on a rotatable support with its other end projecting from the support and its outer extremity providing a grinding surface, all of said projecting portion, except a narrow front edge section, being of uniform thickness and bounded on opposite sides by parallel plane surfaces, said narrow front section being thicker than the main body thereof, both lateral faces of said section lying outside of and being equally spaced from the adjacent parallel plane surfaces, said lateral faces converging similarly towards the base portion of the tooth.

4. An abrasive saw tooth comprising a flat relatively long body having one end providing a base portion adapted for mounting on a rotatable support with its other end projecting from the support and its outer extremity providing a grinding surface, the greater part of said projecting portion being of uniform thickness, a narrow section of said projecting portion adjacent and parallel to its front edge being thicker than the main body thereof, the thickness of said section being a maximum at its juncture with said grinding surface and diminishing to a minimum adjacent said base portion.

5. An abrasive saw tooth comprising a flat relatively long body having one end providing a base portion adapted for mounting on a rotatable support with its other end projecting from the support and its outer end providing a grinding surface, the greater part of said projecting portion being of uniform thickness and bounded on opposite sides by parallel plane surfaces, a narrow section of said projecting portion adjacent and parallel to its front edge being thicker than the main body thereof, the thickness of said section being a maximum at its juncture with said grinding surface and uniformly diminishing to a minimum adjacent said base portion.

6. An abrasive saw tooth comprising a flat relatively long body having one end providing a base portion adapted for mounting on a rotatable support with its other end projecting from the support and its outer end providing a grinding surface, the greater part of said projecting portion being of uniform thickness and bounded on opposite sides by parallel plane surfaces, a narrow section of said projecting portion adjacent and parallel to its front edge being thicker than the main body thereof, the thickness of said section being a maximum at its juncture with said grinding surfaces, said section being bounded on opposite sides by equally spaced plane surfaces similarly converging towards said base portion.

7. An abrasive saw tooth comprising a flat relatively long body having one end providing a base portion adapted for mounting on a rotatable support with its opposite end projecting from the support and its outer bounding edge providing a grinding surface, the greater part of said projecting portion being of uniform thickness and bounded on opposite sides by plane surfaces, a narrow section of the projecting portion of the tooth adjacent to the front edge thereof and terminating at said grinding surface being thicker than the main body of said projecting portion, a second narrow section of the body extending diagonally from said grinding surface towards the base portion being also of greater thickness than the main body of the projecting portion, the thickness of said sections being equal at equal distances from the axis of rotation of said support when the tooth is in operative position.

8. An abrasive saw tooth comprising a flat relatively long body having one end providing a base portion adapted for mounting on a rotatable support with its opposite end projecting radially from the support, the outer bounding edge of the tooth providing a grinding surface extending perpendicular to its radial axis, the greater part of said projecting portion being of uniform thickness and bounded on opposite sides by plane surfaces, a narrow section of said projecting portion adjacent to its front edge being thicker than the main body thereof, the thickness of said narrow section being a maximum at its juncture with said grinding surface and diminishing gradually to a minimum adjacent said base portion, a second narrow section of the body extending diagonally from said grinding surface towards the base portion having a thickness greater than that of the main body and diminishing in thickness from a maximum at its juncture with said grinding surface to a minimum adjacent said base portion, the thickness of the two sections being equal at equal distances from the axis of rotation of said support when the tooth is in operative position.

9. An abrasive saw tooth comprising a flat relatively long body having one end providing a base portion adapted for mounting on a rotatable support with its opposite end projecting radially from the support and its outer bounding edge providing a grinding surface extending perpendicular to the radial axis of the tooth, the greater part of said projecting portion being of uniform thickness and bounded on opposite sides by plane surfaces, a narrow section of said projecting portion adjacent to its front edge being thicker than and projecting equally from opposite sides of the projecting portion, the thickness of said narrow section being a maximum at its juncture with said grinding surface and diminishing gradually to a minimum adjacent said base portion, a second narrow section projecting equally from opposite sides of the body and extending diagonally from said grinding surface towards the base portion, the thickness diminishing from a maximum at its juncture with said grinding surface to a minimum adjacent said base portion, the thickness of the two sections being equal at equal distances from the axis of rotation of said support, when the tooth is mounted thereon.

FRED BLEY.